US007927552B2

(12) United States Patent
Cho et al.

(10) Patent No.: US 7,927,552 B2
(45) Date of Patent: Apr. 19, 2011

(54) METHOD OF MIXING FLUIDS AND MIXING APPARATUS ADOPTING THE SAME

(75) Inventors: Yoon-kyoung Cho, Gyeonggi-do (KR); Sang-min Shin, Seoul (KR); In-seok Kang, Gyeongsangbuk-do (KR); Jae-wan Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1085 days.

(21) Appl. No.: 11/256,832

(22) Filed: Oct. 24, 2005

(65) Prior Publication Data

US 2006/0092757 A1 May 4, 2006

(30) Foreign Application Priority Data

Oct. 28, 2004 (KR) ........................ 10-2004-0086773

(51) Int. Cl.
*B01J 19/08* (2006.01)
*B01J 19/12* (2006.01)

(52) U.S. Cl. ................... 422/186; 422/186.04; 204/409; 204/661; 204/663; 366/341

(58) Field of Classification Search ............. 366/DIG. 4, 366/341; 204/409, 661, 663; 422/186, 186.04
See application file for complete search history.

(56) References Cited

U.S. PATENT DOCUMENTS 5,858,195 A * 1/1999 Ramsey ........................ 204/450
5,993,630 A * 11/1999 Becker et al. ................. 204/547
6,086,243 A 7/2000 Paul et al.
6,213,151 B1 4/2001 Jacobson et al.
6,241,379 B1 6/2001 Larsen
6,306,272 B1 * 10/2001 Soane et al. ................. 204/451
6,482,306 B1 11/2002 Yager et al.
6,733,172 B2 * 5/2004 Lee et al. ...................... 366/341
7,189,578 B1 * 3/2007 Feng et al. .................... 436/174
2002/0008028 A1 1/2002 Jacobson et al. .............. 204/451
2002/0125134 A1 * 9/2002 Santiago et al. ........... 366/173.1
2003/0031090 A1 2/2003 Ho et al. ........................ 366/341
2003/0086333 A1 * 5/2003 Tsouris et al. ............. 366/173.1
2003/0169637 A1 * 9/2003 Lee et al. ................... 366/165.2
2004/0140210 A1 7/2004 Cho et al. ....................... 204/409
2007/0175755 A1 * 8/2007 Mezic et al. .................. 204/450
2008/0000772 A1 * 1/2008 Bazant et al. ................. 204/450

FOREIGN PATENT DOCUMENTS

DE 102 13 003 A1 10/2003

OTHER PUBLICATIONS

"Microfluidic Devices for Electrokinetically Driven Parallel and Serial Mixing"; Authors: Stephen C. Jacobson, et al.; Anal. Chem, 71, pp. 4455-4459 (1999).
"A Modular Microfluid System With an Integrated Micromixer"; Authors: Norbert Schwesinger, et al.; J. Micromech, Microeng., 6, pp. 99-102 (1996).

(Continued)

*Primary Examiner* — Tony G Soohoo
(74) *Attorney, Agent, or Firm* — Cantor Colburn LLP

(57) ABSTRACT

Provided are a method of and an apparatus for rapidly and effectively mixing fluids even in a laminar flow regime with a very low Reynold's number by applying AC power with a resonant frequency to more effectively induce electrokinetic instability. Also provided are a method of and an apparatus for mixing fluids in which the degree of mixing of the fluids can be varied with time by applying AC power with a lower frequency than a resonant frequency to synchronize a pattern of mixing fluids with the AC power.

4 Claims, 8 Drawing Sheets

OTHER PUBLICATIONS

"Towards Integrated Microliquid Handling Systems" Authors: M. Elwenspoek, et al.; J. Micromech, Microeng., 4, pp. 227-245 (1994).

"Chaotic Mixing in Electrokinetically and Pressure Driven Micro Flows"; Authors: Yi-Kuen Lee, et al.; The 14th IEEE Workshop on MEMS Interlaken, Switerland, (2001).

"Passive Mixing in a Three-Dimensional Serpentine Microchannel"; Authors: Robin H. Liu, et al; Journal of Microelectromechanical System, vol. 9, No. 2 (2000).

"Electrokinetic Instability Micromixing" Authors: M.H. Oddy, et al.; Anal. Chem. vol. 73, pp. 5822-5832 (2001), Dec. 15, 2001, 11 pgs.

European Search Report for Application No. 05022796.6; Dated : Apr. 26, 2006, 9 pages.

"Technique and Application of Micro Chemical Chips", Authors: Kitamori Takehiko, et al.; Society for Chemistry and Micro-Nano Systems (5 pages), dated 2004.

* cited by examiner

A

B

C

METHOD OF MIXING FLUIDS AND MIXING APPARATUS ADOPTING THE SAME

CROSS-REFERENCE TO RELATED PATENT APPLICATION

This application claims the benefit of Korean Patent Application No. 10-2004-0086773, filed on Oct. 28, 2004, in the Korean Intellectual Property Office, the disclosure of which is incorporated herein in its entirety by reference.

BACKGROUND OF THE INVENTION

1. Field of the Invention

The present invention relates to a method of mixing fluids and a mixing apparatus adopting the method, and more particularly, to a method of mixing fluids by causing electrokinetic instability in a channel and a mixing apparatus adopting the method.

2. Description of the Related Art

Microfluidic devices that can perform chemical or biological analyses using a chip have received significant attention over the past decade. With the development of related technologies, the scales of these devices have decreased below 1 mm and various analysis devices which filled laboratories in the past can now be integrated onto a credit card-sized chip, which is called a “Lab-on-a-Chip”. Such technical progress has resulted in a reduction of production costs and has enabled various analysis experiments to be simultaneously performed, thereby reducing analysis time, reducing the amounts of samples used and allowing in situ operations. Thus, the Lab-on-a-Chip technology is expected to contribute greatly to the development of biomolecular research such as genomics, proteomics, etc.

In the miniaturization and integration of microfluidic devices, a variety of design parameters should be carefully considered. One important design parameter is that biological or biochemical reagents or solutions be homogeneously mixed within a limited time.

When the mixing time is similar to or greater than a chemical reaction time, rapid mixing becomes more important. In a microfluidic device, a capillary with a very small internal diameter is often used and a microfluid passing through the capillary has a very low Reynold’s number. At a very low Reynold’s number, laminar flow occurs, and thus the turbulence, which is very valuable as a stirring means, cannot be used, which makes rapid mixing difficult.

Homogeneous mixing is achieved when there is no concentration gradient. The reduction of a concentration gradient in laminar flow is largely dependent on molecular diffusion. The diffusion time $t_D$ is proportional to the square of a diffusion length $L_D$ as follows $$t_D \approx \frac{L_D^2}{D} \tag{1}$$

where D is the diffusion coefficient.

Thus, to reduce the diffusion time for a constant diffusion coefficient, a method of increasing a contact boundary of two fluids mixed and reducing the diffusion distance is being developed. Mixing methods such as lamination mixing, micro-plume injection, chaotic mixing, parallel/serial mixing, and the like are known.

The lamination mixing is an effective mixing method, but requires a fine three-dimensional (3D) structure which has high production costs and requires a channel with a large cross-sectional area. Teachings on lamination mixing can be found in “Microfluidic Devices for Elecrokinetically Parallel and Serial Mixing”, Anal. Chem., 1999, 71, 4455-4459, by Jacobson et al., “A Modular Microfluid System with an Integrated Micromixer”, J. Micromech. Microeng. 1996, 6, 99-102, by Schwessinger, et al., U.S. Pat. No. 6,213,151, and U.S. Pat. No. 6,241,379. The parallel/serial mixing has similar problems to the lamination mixing and requires a long channel for sufficient mixing. The parallel/serial method is described by Jacobson, et al.

The microplume injection is a method of injecting fluid A into fluid B through multiple microplumes and the length of a channel required for mixing is relatively short. The fluid A injected into the fluid B slowly diffuses to be homogeneous. The homogeneity of the mixture is proportional to the number density of the microplumes into which the fluid A is injected per unit cross-sectional area. However, it is difficult to process the microplumes for injecting the fluid A. Microplume injection is described in detail in “Towards Integrated Microliquid Handling Systems”, J. MicroMech. Microeng. 1994, 4, 227-245, by Elwenspoek, et al.

The chaotic mixing is obtained through chaotic convection using a forced jet. However, to practically use chaotic mixing, a very complicated structure is required, and thus technical and economical difficulties arise. This method is describe in detail in “Chaotic Mixing in Electrokinetically and Pressure Driven Micro Flow”, Proc. 14th IEEE Workshop MEMS 2001, 483-486, by Lee et al., and “Passive Mixing in a Three-Dimensional Serpentine Microchannel”, J. Microelectromech. Syst. 2000, 9, 190-197, by Liu et al.

All of the above-described mixing methods are referred to as “passive mixing” methods which are differentiated from active mixing methods. In general, active mixing methods include an operating unit or an external mixing means such as pressure or an electric field. An active mixing method including the operating unit has difficulties in terms of molding and control of a mixing apparatus, and thus, is used only in special cases.

U.S. Pat. No. 6,086,243 issued to Paul et al. discloses a method of and an apparatus for effectively and rapidly mixing liquids in a creeping flow regime. According to Paul et al., fluids in a capillary which cannot be stirred mechanically or by turbulence can be homogeneously mixed by applying an electric field to each liquid. However, Paul et al. requires a separate chamber for mixing, thereby demanding more space and has low mixing efficiency due to the use of only circulation flow caused by a direct current (DC) power supplied to the liquid.

U.S. Pat. No. 6,482,306 issued to Yager et al. discloses an efficient apparatus for mixing liquids which does not require a separate chamber by forming electrodes and a chargeable surface on the wall surface of a channel. Yager et al. is more suitable for continuous flow than Paul et al., but discloses only circulation flow formed by supplying DC power, and thus is limited in terms of mixing efficiency.

U.S. Patent Application Publication No. 2002-125134 issued to Santiago et al. enhances mixing efficiency by supplying alternating current (AC) power instead of DC power. That is, when AC power is applied to both sides of a channel, arbitrary 3D fluctuations occur in a liquid within a few seconds, thereby causing electrokinetic instability (EKI) which stirs liquids actively, rapidly and effectively. A method of mixing a solution using EKI to obtain a homogeneous solution is useful in various fields, such as biochemistry, etc. However, in Santiago et al., a separate mixing chamber for supplying the AC power in a direction perpendicular to the flow direction of the fluid is required, which results in an unnecessary dead-zone. In addition, only the supply of the AC power is described, and how to optimize the AC power and maximize the mixing efficiency is not mentioned.

In addition, Santiago et al. attempted to mix two fluids by supplying DC power in a T-shaped channel. However, flow choking is caused at a point where two fluids meet and convective mixing no longer occurs due to laminar flow in a downstream of the channel. When the intensity of the electric field is increased to solve these problems, electrolysis or the formation of bubbles takes place.

SUMMARY OF THE INVENTION

The present invention provides a method of rapidly and effectively mixing fluids even in a laminar flow regime with a very low Reynold's number.

The present invention also provides an apparatus for rapidly and effectively mixing fluids even in a laminar flow regime with a very low Reynold's number.

The present invention also provides a chemical analysis apparatus using the apparatus for rapidly and effectively mixing fluids even in a laminar flow regime with a very low Reynold's number.

The present invention also provides a method of mixing fluids which can control the degree of mixing of the fluids with time.

The present invention also provides an apparatus for mixing fluids which can control the degree of mixing of the fluids with time.

The present invention also provides a chemical analysis apparatus using the apparatus for mixing fluids which can control the degree of mixing of the fluids with time.

According to an aspect of the present invention, there is provided a method of mixing fluids, including: supplying at least two fluids to be mixed through at least two channels connected to each other at a connection; and applying to the channels AC power with a resonant frequency corresponding to the period of a mixing pattern cycle induced by DC power to form electrokinetic instability (EKI) in the fluids.

According to another aspect of the present invention, there is provided an apparatus for mixing fluids, including: a plurality of channels through which fluids flow; one or more connections of the channels; at least two electrodes located on opposite sides of the channels; and a power supplying means supplying AC power with a resonant frequency to the at least two electrodes.

According to another aspect of the present invention, there is provided a chemical analysis apparatus using the apparatus for mixing fluids.

When using the mixing method and the mixing apparatus, an efficient mixing of fluids which could not be sufficiently mixed by conventional methods and apparatuses can be achieved.

According to another aspect of the present invention, there is provided a method of mixing fluids, including: supplying at least two fluids to be mixed through at least two channels connected to each other at one or more connections; and applying to the channels AC power with a lower frequency than a resonant frequency corresponding to the period of a mixing pattern cycle induced by DC power to form electrokinetic instability (EKI) in the fluids.

According to another aspect of the present invention, there is provided an apparatus for mixing fluids, including: a plurality of channels through which fluids flow; one or more connections of the channels; at least two electrodes located on opposite sides of the channels; and a power supply supplying AC power with a frequency less than a resonant frequency to the at least two electrodes.

According to another aspect of the present invention, there is provided a chemical analysis apparatus using the apparatus for mixing fluids described just above.

The mixing method and the mixing apparatus can be used to prepare a mixed solution the concentration of which periodically changes and can be applied to various chemical analysis apparatuses.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in greater detail.

It is well known that when an electric field is applied to a liquid, electroosmotic flow can be caused. The electroosmotic flow results from electroosmosis, which is an interaction between an electric field formed by electrodes and charges on a channel wall. The channel used to produce the electroosmosis is mainly composed of a dielectric material. All or part of the channel may be composed of the dielectric material. The dielectric material should have a lower electrical conductivity than liquids flowing in the channel, and silica or glass is usually used.

Figure 1A:
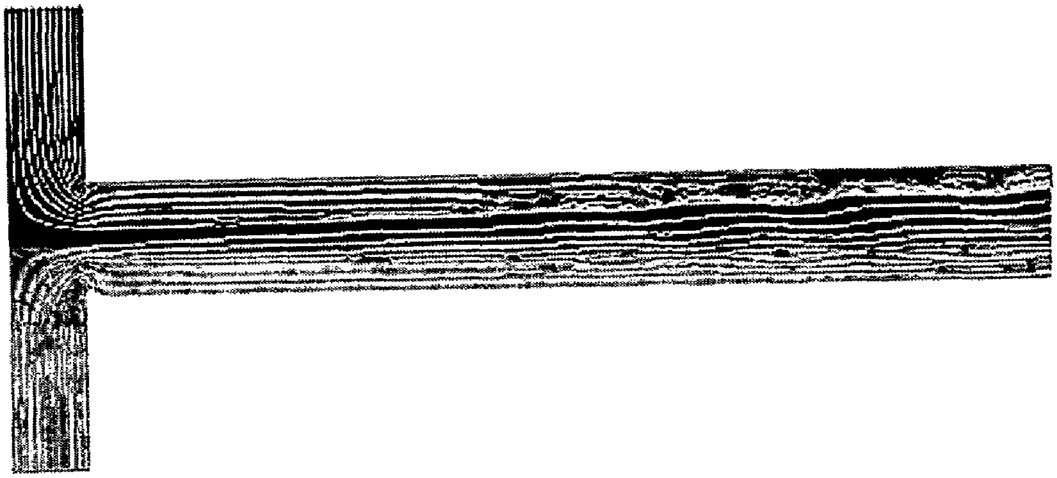
FIG. 1A is a fluorescence image of a mixing pattern of fluids when applying DC power to a T-shaped channel according to conventional technology.
Figure 1B:
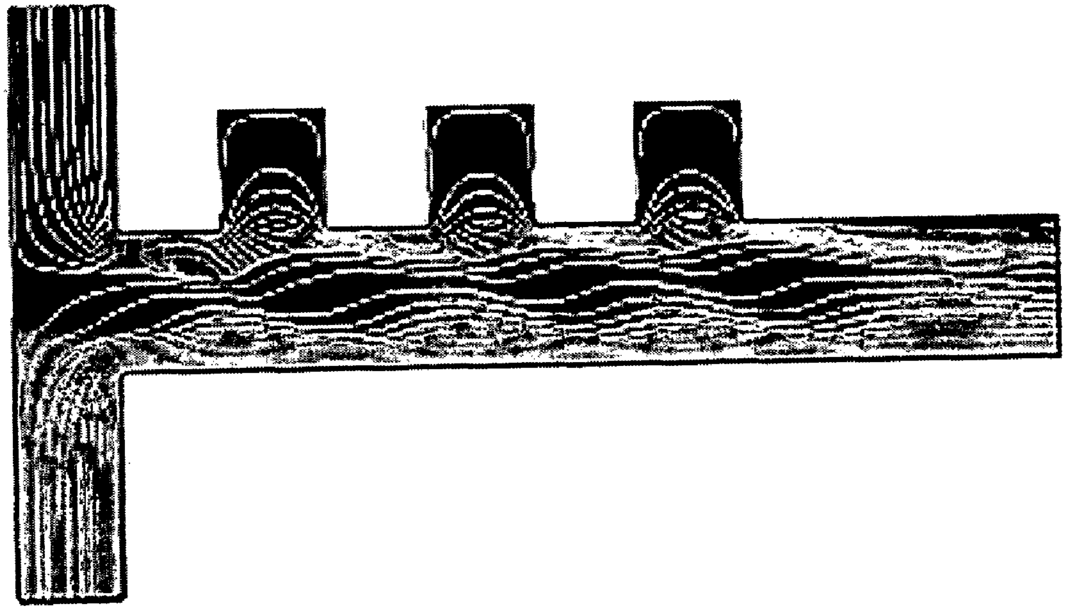
FIG. 1B is a fluorescence image of mixing pattern of fluids when applying DC power to a T-shaped channel having recesses according to an embodiment of the present invention.

FIGS. 1A and 1B illustrate two fluids mixed in a T-shaped channel. The two fluids meet at a connection of the T-shaped channel from opposite sides, change their flow direction due to a pressure gradient, and are mixed while flowing to an outlet. However, when the Reynold's number is extremely low, the two fluids are rarely mixed with each other due to a laminar flow.

As illustrated in FIGS. 1A and 1B, when DC power is applied, the fluids fluctuate and mix with each other. The thin solid lines along the channel in FIGS. 1A and 1B represent electric field lines. The electric field is proportional to the density of electric field lines.

It is known that the magnitude of a force generated by charging is given by $$\rho_f = \frac{\varepsilon}{\sigma}(-\nabla\sigma)\cdot E. \tag{2}$$

As can be seen from Equation 2, the magnitude of force generated by charging is proportional to an inner product of an electric field E and the gradient of electric conductivity. Here, is a dielectric constant and $_f$ is the magnitude of force generated by charging.

Since the magnitude of the electric field is represented by a ratio of a voltage applied to electrodes to a distance between the electrodes, as long as the position of the electrodes is fixed and the voltage is constant, the magnitude of the electric field is constant.

Referring to FIG. 1B, at least one recess is formed in a T-shaped channel according to an embodiment of the present invention. The magnitude of the electric field is found to be highest near the channel wall between the recesses.

Thus, it can be seen that the magnitude of the force generated by charging is high near the channel wall between recesses, and thus forming recesses with regular or various sizes at regular or various intervals is more suitable for mixing than not forming recesses. Referring to FIG. 1A, when DC power is applied without forming recesses, the electric field lines have a regular form, and thus fluids are affected by force in only one direction, resulting in a low mixing efficiency. Referring to FIG. 1B, when DC power is applied in the presence of recesses, the electric field lines have a wave form and are dense, in particular, near the channel wall between recesses, which indicates that the magnitude of the force generated by charging is high.

Figure 2:
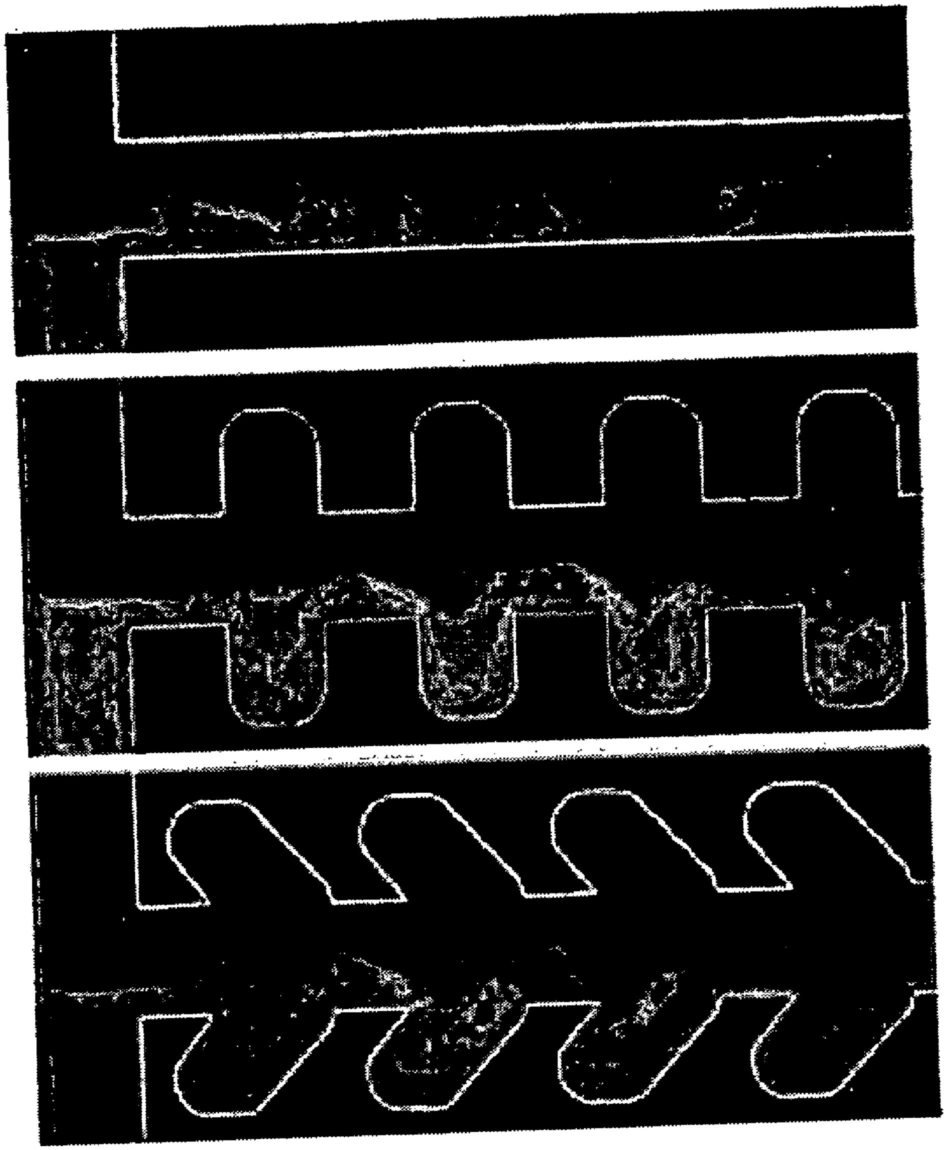
FIGS. 2A through 2C are fluorescence images of mixing pattern of fluids when DC power is applied to T-shaped channels having recesses with various shapes.
Figure 3:
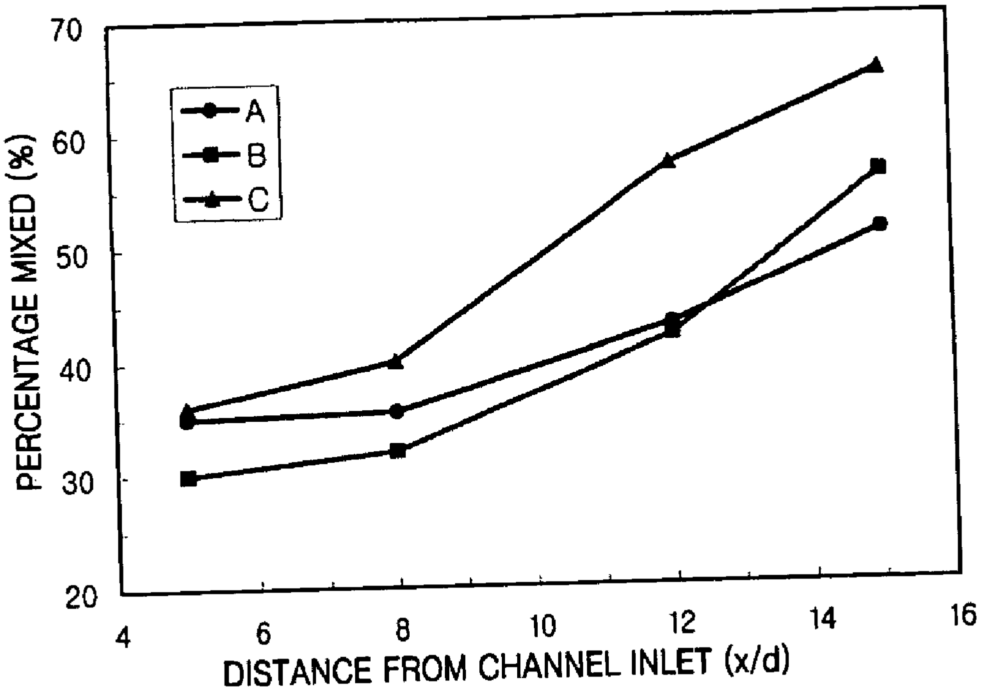
FIG. 3 is a graph illustrating a degree of mixing of fluids with position when applying DC power to the T-shaped channels illustrated in FIG. 2.

To confirm the above fact, variations in the degree of mixing were inspected for channels having various kinds of recess as illustrated in FIGS. 2A, 2B and 2C. To quantify the degree of mixing, the degree of mixing Z is defined as Equation 3

$$Z = \left(1 - \frac{\sqrt{\frac{1}{N}\sum_{i=1}^{N}(I_i - I_i^*)^2}}{\sqrt{\frac{1}{N}\sum_{i=1}^{N}(I_i^0 - I_i^*)^2}}\right)\times 100 \tag{3}$$

where N is the number of pixels, $I_i$ is the intensity of an $i^{th}$ pixel, $I_i^0$ is the intensity of the $i^{th}$ pixel when the fluids are not mixed, and $I_i^*$ is the intensity of the $i^{th}$ pixel when the fluids are completely mixed. FIG. 3 is a graph illustrating the degree of mixing with respect to flow distance using Equation 3. In FIG. 3, d is the width of the channel and x is the distance from the channel inlet. In FIG. 3, the horizontal axis denotes a dimensionless relative distance obtained by dividing x by d.

Referring to FIG. 3, the channel with recess of C has as much as a 20% higher degree of mixing than the channel without recess and its mixing efficiency was the highest among the three channels illustrated in FIG. 3. However, the channel with the recess of C is not optimal, and better recesses can be designed.

Figure 4A:
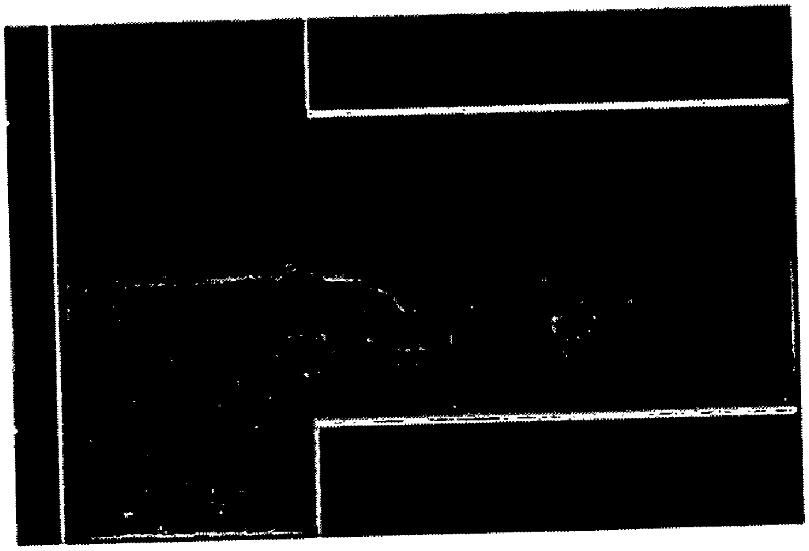
FIG. 4A is a fluorescence image of fluids mixed in a T-shaped channel according to conventional technology.

Meanwhile, a conventional channel has a T-shaped connection at which two fluids meet as illustrated in FIG. 4A. Referring to FIG. 4A, when two fluids meet at the T-shaped connection and flow, only one interface is available for generating EKI.

In this case, the conventional microfluidic mixer has insufficient mixing efficiency and hence, although mixing occurs along the channel, a first fluid is relatively abundant near one of the channel walls and a second fluid is relatively abundant near another channel wall, which restricts the utilization of the microfluidic mixer.

Figure 4B:
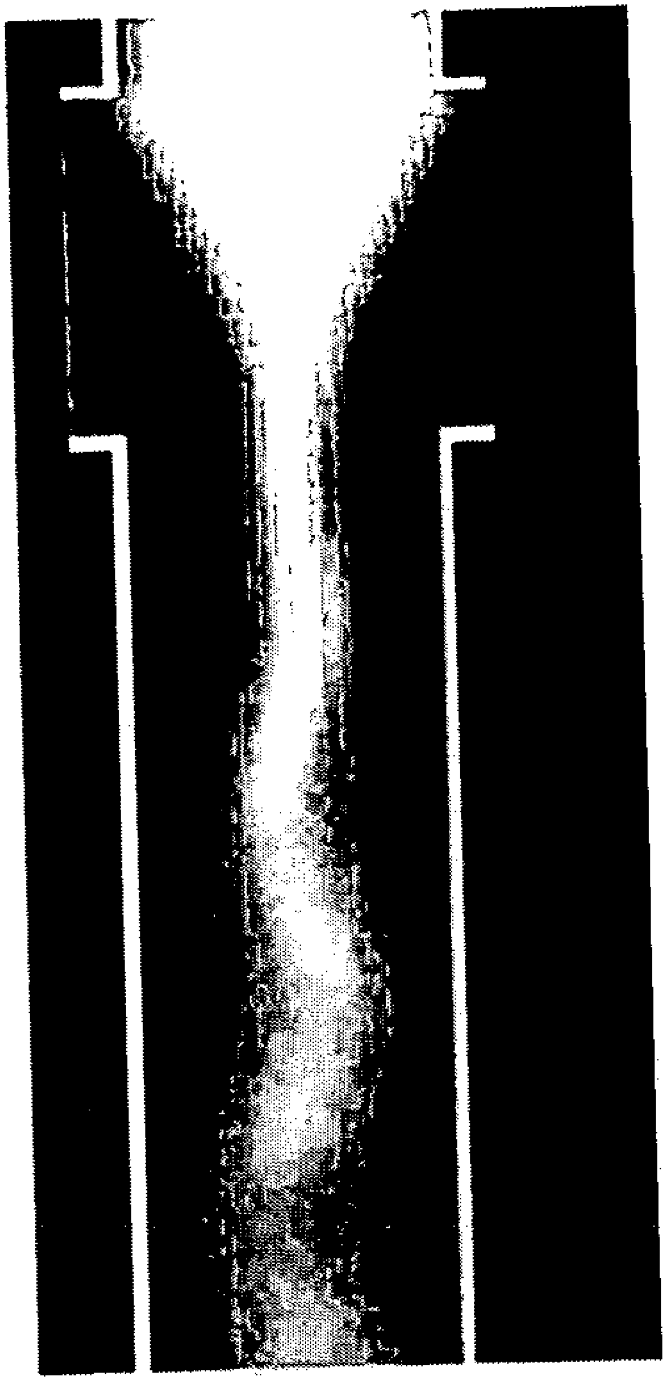
FIG. 4B is a fluorescence image of fluids mixed in a cross-shaped channel according to the present invention.

However, when two fluids meet at a cross-shaped connection and flow as illustrated in FIG. 4B, two interfaces are available for generating EKI, and thus, improved mixing efficiency can be expected and the use of the microfluidic mixer is possible as described below. However, the connection does not necessarily have a right-angled cross shape as long as the second fluid is injected from both sides of the first fluid.

When DC power is applied to induce EKI while at least two fluids flow in channels, a regular mixing pattern cycle is generated. That is, a mixing pattern varies with a regular cycle. When AC power having a specific frequency is used instead of the DC power or with the DC power, an anode and a cathode are periodically changed, which enhances and more effectively induces EKI.

In other words, at the time of half a period of the mixing pattern cycle when DC power is applied, the mixing pattern has a phase opposite to the phase when DC power is initially applied. At this time, if the cathode and the anode are switched, the degree of mixing can be amplified. That is, when AC power with the same frequency as the mixing pattern cycle is applied, the phase of the electric field and the phase of the mixing pattern are identical, and thus mixing is amplified. In this case, the frequency of the AC power is called the resonant frequency.

The AC power is given by $$V = V_{max}\sin(2\pi ft) \tag{4}$$

where f is the resonant frequency of the AC power, t is time, and $V_{max}$ is the maximum voltage.

Since the resonant frequency varies from system to system, it is necessary to determine the resonant frequency by initially applying DC power to investigate a mixing pattern cycle when the present invention is first applied. To do this, the varying mixing pattern can be photographed at high speed, and the interval of time between identical mixing patterns can be measured to obtain the mixing pattern cycle. Other methods can also be used to measure the resonant frequency.

Figure 8:
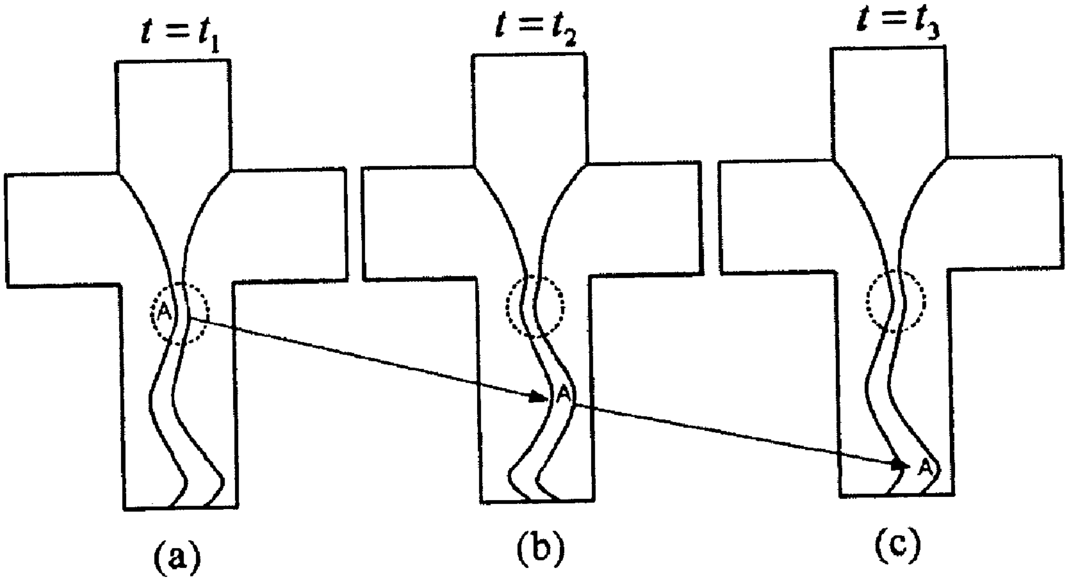
FIG. 8 is a schematic diagram illustrating a method of determining the resonant frequency in FIG. 7.

In the T-shaped channel, the reciprocal of the period of the mixing pattern cycle expressed in seconds is the resonant frequency (Hz). However, in the cross-shaped channel, twice the reciprocal of the period of the mixing pattern cycle expressed in seconds is the resonant frequency since, when DC power is applied to the cross-shaped channel, two interfaces having a wave-shaped pattern are formed as illustrated in FIG. 8. Thus, when AC power with the resonant frequency, which is twice the frequency of the mixing pattern cycle, is applied, two interfaces are stimulated respectively so as to increase the mixing efficiency.

The mixing pattern cycle does not vary greatly according to the mixed solvent, the shape and size of the mixing system, the frequency of the AC power used, the DC power, the voltage, and the like and it is empirically recognized that the resonant frequency of the mixing pattern cycle is in the range of 0.1 to 100 Hz. In addition, the resonant frequency is in the range of 7 to 15 Hz for most microfluidic mixers for biological application, and very often in the range of 9 to 13 Hz. Thus, it is not necessary to measure the resonant frequency every time when applying the technical concept of the present invention.

Even though the AC power may be applied alone, it is preferably applied together with the DC power. In this case, fluids move due to an electroosmotic force generated by the DC power and are simultaneously mixed and transferred under the influence of the AC power.

The frequency of the AC power can be lower than the resonant frequency.

Figure 5:
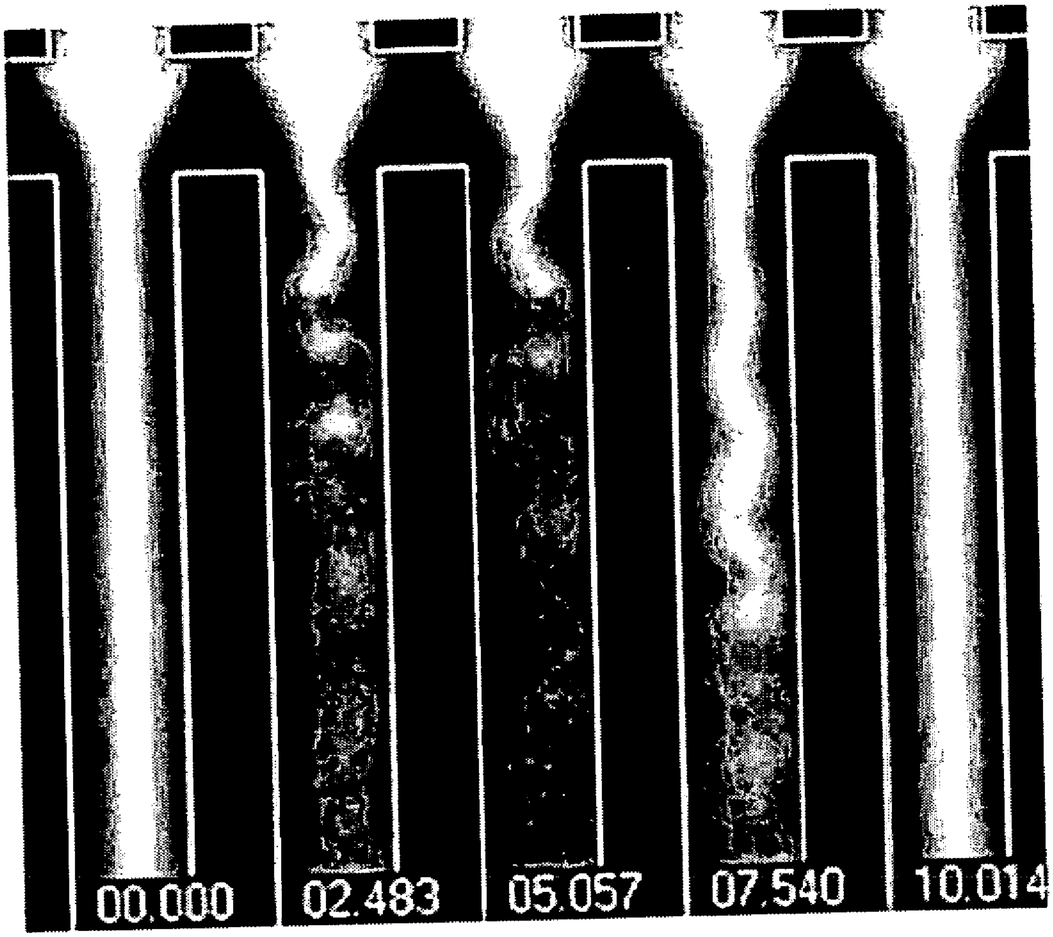
FIG. 5 is continuous fluorescence images of fluids having a mixing pattern cycle synchronized with the frequency of AC power when applying AC power with a lower frequency than a resonant frequency of the mixing pattern.

When the frequency of the AC power is lower than the resonant frequency, the mixing pattern cycle synchronizes with the AC power. Thus, the pattern cycle can be easily controlled by adjusting the frequency of the AC power. At this time, the shape of the mixing pattern changes in time as illustrated in FIG. 5. When the frequency of the AC power applied is 0.1 Hz which is the case of FIG. 5, the interval of time until the same mixing pattern is shown is about 10 sec, which indicates that the frequency of the AC power is synchronized with the pattern cycle.

When inspecting the end of the channel in FIG. 5, the degree of mixing at the end of the channel varies with time. Thus, the degree of mixing at the end of the channel with time can be controlled by adjusting the frequency of the AC power.

When taking the fluid only from the central portion at the end of the channel, a sample with a periodically varying concentration can be obtained. The obtained sample can be utilized in a research of kinetics in various concentrations, etc. It can also be utilized to determine a reaction constant while changing the concentration of the reactants in biological or general chemical reactions such as DNA hybridization and enzyme assay.

Although the sample having a periodically varying concentration can be obtained in the T-shaped channel, it can more effectively obtained when using the channel designed such that a second fluid is injected from both sides of a first fluid as in the present embodiment. This is because the concentration of the sample in the T-shaped channel fluctuates less than in the channel of the present embodiment. Thus, the channel in which a second fluid is injected from both sides of a first fluid is advantageous over the T-shaped channel since it can be more effectively used for the purposes described above and mixing occurs at two interfaces.

The present invention will now be described in greater detail with reference to the following examples. The following examples are for illustrative purposes only and are not intended to limit the scope of the invention.

EXAMPLE

Figure 6A:
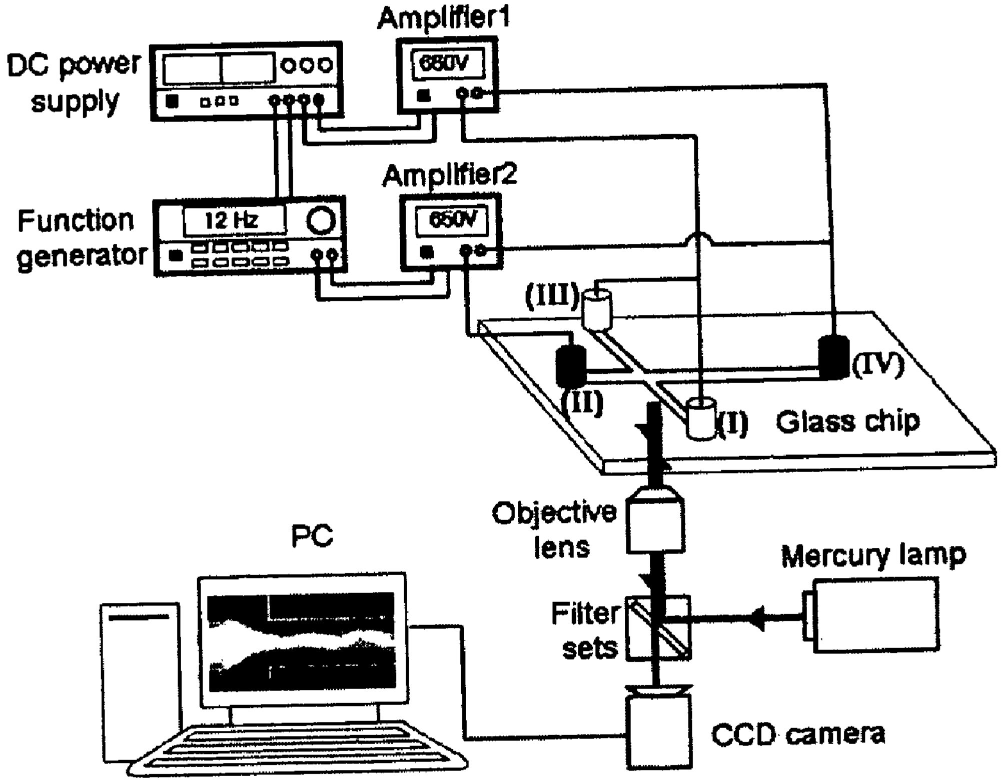
FIG. 6A is a schematic diagram of an apparatus for mixing fluids according to an embodiment of the present invention.
Figure 6B:
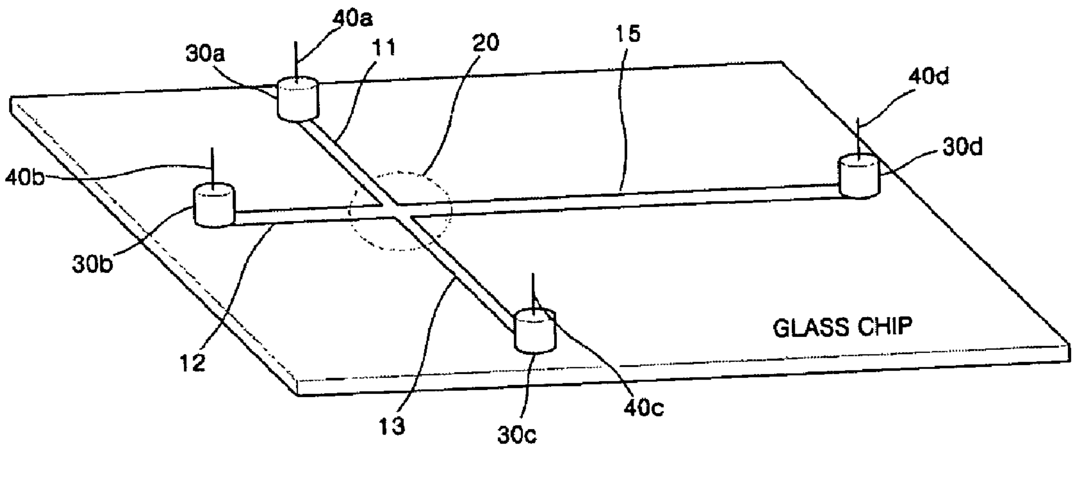
FIG. 6B is a perspective view of main portions of the apparatus illustrated in FIG. 6A.

FIGS. 6A and 6B are schematic diagrams of an apparatus used in the present example.

Liquids for Mixing and Materials for Visualization 1 mM and 10 mM NaCl solutions were used as liquids for mixing. Fluorescein F7505 (Sigma) was used as a fluorescent dye for visualizing the mixing. The fluorescent dye was mixed with the 10 mM NaCl solution so as to have a concentration of 5 .M.

Preparation of a Chip Including a Channel

A cross-shaped channel with an injection channel having a length of 1 cm and a discharge channel having a length of 2 cm was prepared on a glass chip. The channels had rectangular cross-sections, widths of 60, and depths of 50.

Structure of an Experimental Apparatus

Referring to FIG. 6B, channels 11, 12 and 13 were respectively equipped with reservoirs 30*a*, 30*b* and 30*c* for storing fluids and a discharge channel 15 was equipped with a reservoir 30*d* for storing mixed fluids. The reservoir 30*b* was filled with the mixture of the 10 mM NaCl solution and the fluorescent dye and the reservoirs 30*a* and 30*c* were filled with the 1 mM NaCl solution.

Only DC power was applied between electrodes 40*a* and 40*d* and between electrodes 40*c* and 40*d* and DC power and AC power were applied between electrodes 40*b* and 40*d*. To generate the power, a high voltage amplifier (Bertan ARB-30), DC power supply (Hewlett-Packard 3630A) and a function generator (Hewlett-Packard 33120A) were used. These formed an electric field with a specific frequency and a 650 V DC power and a 50 V AC power with a frequency ranging from 0.1 to 50 Hz were used in the present example.

Visualization of Mixing of Fluids

Fluorescence images of the fluids were observed using an inverted epifluorescent microscope (Nikon TE300) and a 100 W mercury lamp. The image was captured using a 12 bit CCD camera (Quantix 57, Photometrics) with 13 square pixels. The captured image was analyzed using image analysis software (MetaMorph 6.1, Universal Image). To increase a frame rate, pixels were bound 2×2. The experimental apparatus is schematically illustrated in FIG. 6A.

Figure 7:
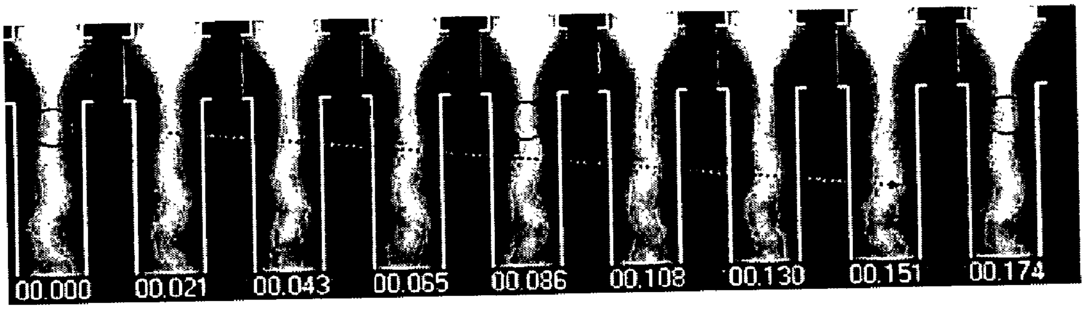
FIG. 7 is fluorescence images illustrating the procedure of determining a resonant frequency from variations of a mixing pattern when applying DC power.

To measure the mixing pattern cycle, images of a mixing pattern obtained using DC power (650 V) over time were obtained as illustrated in FIG. 7 and analyzed using the method illustrated in FIG. 8. Referring to FIG. 8, an interface at a specific point in the channel periodically becomes convex or concave. The time required for two convex portions (or concave portions) of the interface to pass a point is the period of the mixing pattern cycle. As can be seen from FIG. 8, the interval of time until a portion of the interface with the same shape as the portion A appears again at the same position is the period of the pattern cycle. When the image of FIG. 7 was analyzed in this manner, the period of the pattern cycle was determined to be about 0.151 to 0.174 sec. A resonant frequency calculated using the period of the pattern cycle was about 12 Hz.

Figure 9:
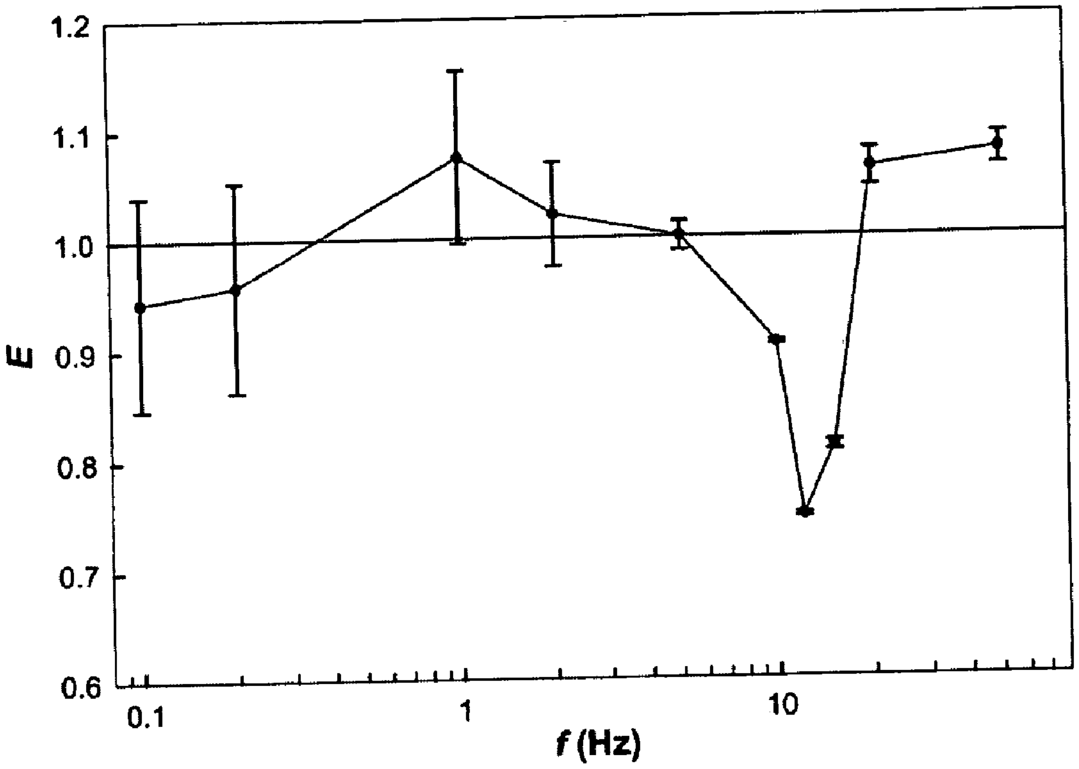
FIG. 9 is a graph of a mixing enhancement factor with respect to the frequency of AC power.

To verify whether a maximum degree of mixing was obtained at the obtained resonant frequency, the degree of mixing was quantitatively inspected while changing the frequency of the AC power. To quantify the degree of mixing, a dispersion coefficient CV was defined $$CV = \frac{\sqrt{\sum_{i=1}^{n} \frac{(I_i - I_{avg})^2}{n}}}{I_{avg}} \tag{5}$$

where n is the number of pixels, $I_i$ is the intensity of the $i^{th}$ pixel, and $I_{avg}$ is an average of the intensities of all the pixels. In Equation 5, a lower CV value implies a higher degree of mixing. In addition, a mixing enhancement factor E was defined using the CV value as follows $$E = \frac{CV_{TP}}{CV_{Static}} \quad (6)$$

where $CV_{TP}$ is the average of CV values with time at a predetermined frequency of AC power and $CV_{Static}$ is the average of CV values when DC power is applied. Since $CV_{Static}$ is constant, a lower E means that mixing occurs well. FIG. 9 is a graph illustrating the relationship between E and the frequency of the AC power. It can be seen from FIG. 9 that the mixing enhancement factor E has a minimum value when the frequency of the AC power is 12 Hz, which is identical to the results obtained from the pattern analysis of the DC power previously performed.

Thus, it can be seen that maximum degree of mixing occurs when the AC power with the resonant frequency is applied.

As described above, a method of mixing fluids according to an embodiment of the present invention can rapidly and effectively mix fluids even in a laminar flow regime with a very low Reynold's number by applying AC power with a resonant frequency to more effectively induce EKI. In addition, the degree of mixing fluids can be varied over time by applying AC power supply with a lower frequency than the resonant frequency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for mixing fluids, comprising:

channels through which fluids flow, wherein the fluids begin flowing at an end of each of the channels;

one or more connections of the channels;

a discharge channel connected to the one or more connections, wherein the fluids from the ends of the channels flow toward an end of the discharge channel at which the fluids stop flowing;

at least two electrodes, wherein one of the at least two electrodes is disposed at the end of the discharge channel, and another of the at least two electrodes is disposed at the end of one of the channels;

more than one recess formed in a given side of at least one of the channels; and a power supply which supplies an alternating current power with a frequency equal to or less than a resonant frequency of a mixing pattern cycle of the fluid in the channels to the at least two electrodes, wherein electrokinetic instability is formed in the fluids by the alternating current power.

2. The apparatus of claim 1, wherein the fluids include a first fluid and a second fluid, the channels include a channel through which the first fluid flows and a channel through which the second fluid flows, and the channel through which the first fluid flows is connected to the channel through which the second fluid flows by the one or more connections of the channels.

3. The apparatus of claim 1, wherein a portion of a periphery of the more than one recess formed in the given side of the at least one of the channels is nonlinear.

4. A chemical analysis apparatus comprising an apparatus for mixing fluids, wherein the apparatus for mixing fluids comprises:

channels through which fluids flow, wherein the fluids begin flowing at an end of each of the channels;

one or more connections of the channels;

a discharge channel connected to the one or more connections, wherein the fluids from the ends of the channels flow toward an end of the discharge channel at which the fluids stop flowing;

at least two electrodes, wherein one of the at least two electrodes is disposed at the end of the discharge channel, and another of the at least two electrodes is disposed at the end of one of the channels;

more than one recess formed in a given side of at least one of the channels; and a power supply which supplies an alternating current power with a frequency equal to or less than a resonant frequency of a mixing pattern cycle of the fluids in the channels to the at least two electrodes, wherein electrokinetic instability is formed in the fluids by the alternating current power.

* * * * *